United States Patent [19]

Zimmermann

[11] 3,931,470
[45] Jan. 6, 1976

[54] TAPE MARKING AND INDICATING DEVICE FOR REMOTE CONTROL OPERATION

[75] Inventor: Joseph J. Zimmermann, Elm Grove, Wis.

[73] Assignee: GTE Automatic Electric Laboratories Incorporated, Northlake, Ill.

[22] Filed: Nov. 4, 1974

[21] Appl. No.: 520,507

[52] U.S. Cl. .................................. 179/6 R; 179/6 E
[51] Int. Cl.² .......................................... G11B 15/18
[58] Field of Search .......... 179/6 R, 6 E, 6 TA, 2 A, 179/100.1 DR, 100.1 PS; 360/137

[56] References Cited
UNITED STATES PATENTS

| | | | |
|---|---|---|---|
| 3,541,271 | 11/1970 | Joslow et al. | 179/100.1 PS |
| 3,730,997 | 5/1973 | Konno | 179/6 E |
| 3,804,993 | 4/1974 | Honnold et al. | 179/100.1 PS |
| 3,808,372 | 4/1974 | Sielsch | 179/100.1 DR |
| 3,863,029 | 1/1975 | Zimmermann | 179/6 E |

*Primary Examiner*—Vincent P. Canney
*Attorney, Agent, or Firm*—Robert J. Black

[57] ABSTRACT

Apparatus in a remotely controlled telephone answering device providing an audio or voice message indicating the time elapsed or, alternatively, the amount of tape used in recording telephone messages. In one embodiment, the apparatus comprises a recording medium such as a magnetic tape having the positional information pre-recorded thereon in a first channel and having a second channel for recording telephone messages. A playback head having first and second magnetic transducers respectively aligned with the first and second channels is coupled to a playback amplifier through a head switching relay. The relay is remotely controlled to selectively couple the transducers, one at a time, to the playback amplifier for playing back the positional information and the recorded messages.

6 Claims, 4 Drawing Figures

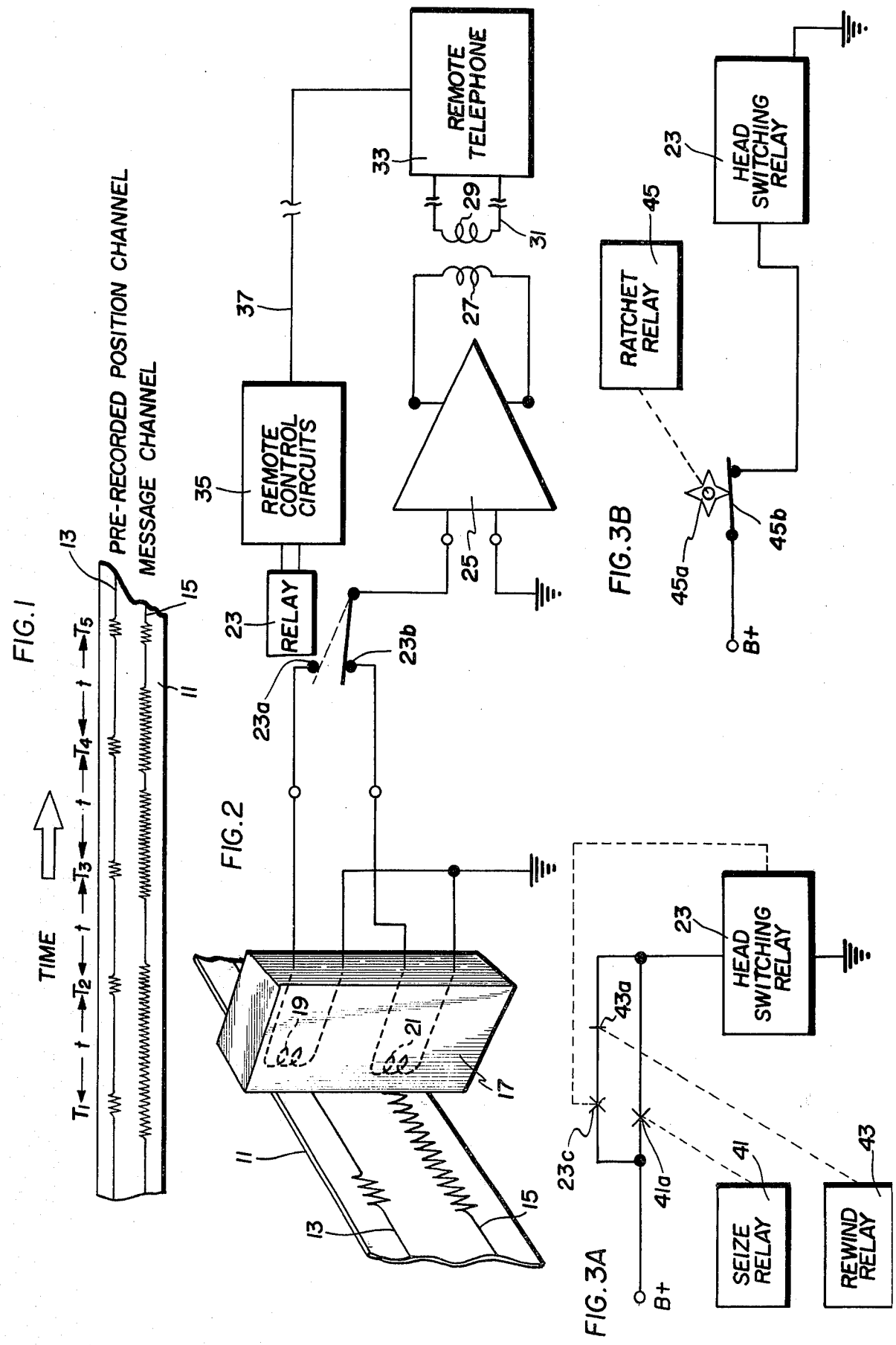

TAPE MARKING AND INDICATING DEVICE FOR REMOTE CONTROL OPERATION

BACKGROUND OF THE INVENTION

The present invention relates generally to remotely controlled telephone answering apparatus and more particularly to apparatus for providing an audible indication of the amount of tape that has been used in recording messages in terms of elapsed recording time or, alternatively, in terms of the length of tape used in recording the messages.

Reference may be made to the following U.S. Pat. Nos.: 2,966,552; 3,576,405; 3,629,508; 3,644,682; 3,692,940; 3,730,997; and 3,794,764.

Remotely controlled telephone answering devices are commonly used to receive and record telephone messages whenever a home or place of business is left unattended. In the absence of the device's user, other persons, upon calling and receiving a pre-recorded message informing them that the user is out, are invited to have their messages recorded by the device for the user's attention when he returns or calls in from a remote location.

One advantage of remotely controlled answering devices is that the user may often times find it more practical to call in to receive messages recorded in his absence rather than returning to his home or office. Since the messages recorded in his absence may dictate his subsequent course of action, the user can then more efficiently schedule his time.

Often, however, when calling in from a remote location, the user for various reasons may have only a limited time in which to play back the recorder messages. If, for example, the recorded messages have consumed many minutes of recording time and the user has only a few minutes to listen to the messages before he must be at his next appointment, he may find it more desirable to wait until later to play back the messages when he has more time, or he may prefer to return to his home or office.

Most existing remotely controlled telephone answering devices, however, do not include means for indicating either the amount of tape used or the time elapsed in recording messages during the user's absence. Thus, when the user seizes control of the apparatus from a remotely located telephone, he has no information available on which to base his decision whether or not he will have enough time to listen to all of the recorded messages. That is, when the device is accessed, the user will not know how much tape is to be played back. Knowledge of the tape position or the amount of elapsed recording time would enable him to decide whether he should play it back immediately or postpone the playback to a more convenient time.

SUMMARY OF THE INVENTION

The apparatus of the present invention overcomes the aforesaid shortcoming by providing audible means for indicating to the user immediately upon accessing the device exactly how much tape must be rewound and then played back to receive all of the recorded messages. The apparatus essentially comprises a two track recording medium such as a magnetic tape whereon a first track or channel comprises pre-recorded tape position information correlating the portion of the tape being listened to to the position of the tape on the reel to provide an indication of the amount of elapsed recording time. The second channel is used to record telephone messages for playback to the user when the remotely controlled telephone answering device is accessed.

In particular, the apparatus includes playback means comprising a dual input playback head having first and second magnetic sensing means for respectively monitoring the first and second channels to convert the positional information and the recorded messages into electrical signals representative thereof. The electrical signals are coupled to means including an amplifier for amplification and conversion into audio signals conveying the contents of the positional information and the recorded messages. The electrical signals are coupled to the amplifier through switch means comprising, for example, a head switching relay, which upon seizure of the answering device by the user, is remotely controlled to selectively couple the first sensing means to the amplifier for playback of the positional information in the first channel to pprovide an audible indication of tape position to the user. The switch means is also remotely controllable by the user to selectively couple the second sensing means to the amplifier for playback of the messages recorded in the second channel.

BRIEF DESCRIPTION OF THE DRAWINGS

The features of this invention which are believed to be novel are set forth with particularity in the appended claims. The invention together with its further objects and advantages thereof, may be best understood, however, by reference to the following description taken in conjunction with the accompanying drawing, in which like reference numerals identify like elements in the several figures and in which:

FIG. 1 illustrates a portion of a two track magnetic recording tape having pre-recorded positional information recorded at certain predetermined intervals on the first track and having audio messages recorded on the second track;

FIG. 2 is a combined schematic and block diagram illustrating remotely controlled playback circuitry in accordance with the present invention for use in a remotely controlled telephone answering device;

FIG. 3A is a schematic diagram illustrating in further detail a first embodiment of the remote control circuit shown in FIG. 2 and used in automatically controlling the playback head switching relay; and FIG. 3B is a schematic diagram illustrating an alternative embodiment of the remote control circuit used in manually controlling the playback head switching relay.

DETAILED DESCRIPTION

Referring now to FIG. 1, there is shown a two track magnetic recording tape 11 having positional information pre-recorded on a first or position track in accordance with one aspect of the present invention and having a second channel or track for recording telephone messages received while the user is away. In the present embodiment, the magnetic tape 11 may comprise any of a number of commercially available two track magnetic recording tapes suitable for audio recording and sound reproduction.

In particular, the tape position information is pre-recorded in a first or position channel 13 so that upon playback the user is audibly informed by voice, via the playback circuitry, of the elapsed message recording time, e.g., in minutes and seconds. Alternatively, the positional information may be given in terms of the length of tape used in recording incoming telephone messages, e.g., in inches. It should be understood, however, that any other information which would be useful in indicating the elapsed time or the amount of tape used in recording messages or the like can also be utilized. Although in FIG. 1 the positional information is depicted as being provided at equal time intervals, $t$, along the length of the tape 11, it should also be understood that the positional information can be given at any time or at any suitable interval deemed appropriate for a particular application.

As further illustrated in FIG. 1, an incoming telephone message is recorded as a series of magnetic disruptions in the second track or message channel 15. It is this information which is converted to an audio or voice signal by the playback circuitry during the playback mode of operation and played back to convey a desired message to the user. Although the pre-recorded positional information stored on the position channel 13 of the tape 11 is not erased, the message information recorded on message channel 15 is commonly erased after playback so that new messages can be recorded without replacing the tape.

With reference now to FIG. 2, there is shown playback apparatus in accordance with the present invention for incorporation in a remotely controlled telephone answering machine or the like for selectively playing back the positional information as well as the recorded message information. To simplify the explanation of the present embodiment, however, the tape transport mechanism and the record circuits of the telephone answering device are not shown. It will be understood, however, that the two track magnetic recording tape 11 is transported past a playback head 17 by a tape transport mechanism (not shown) in a manner well known in the art.

The tape 11 is transported past playback head 17 in a manner such that the pre-recorded position channel 13 is aligned with a first magnetic transducer 19 in playback head 17 while the message channel 15 is similarly aligned with a second magnetic transducer 21. The respective bottom ends of each of transducers 19 and 21 are coupled to a reference potential herein shown to be ground. The other end of coil 19, in turn, is coupled to a head switching relay 23 at a first contact 23a while the other end of coil 21 is coupled to a second contact 23b of relay 23. The magnetic transducers, 19 and 21, monitor the respective channels, 13 and 15, to convert the magnetically recorded information into electrical signals representative thereof. The electrical signals are, in turn, coupled to one input of a playback amplifier comprising, for example, an operational amplifier 25 coupled to head switching relay 23. The other input of amplifier 25 is referenced to ground potential. Accordingly, in a first operative mode relay 23 couples transducer 19 to the input of a playback amplifier 25 while in a second operative mode, relay 23 couples transducer 21 to the corresponding input of amplifier 25.

The resulting audio signal developed by playback amplifier 25 at the output terminals thereof is inductively coupled by means of an inductance 27, coupled to the outputs of amplifier 25, to a second inductance 29 coupled to the telephone line 31. The voice message is then coupled via the telephone line 31 to the remote telephone receiver 33 where the user is listening for the recorded message.

Operationally, when the user calls from a remotely located telephone 33 to the telephone answering device of the present invention, access to the recorded messages is obtained by activating a portable means generating a control tone of a specific frequency which is transmitted from the remote telephone 33 to a decoder circuit (not shown) in the remote control circuit 35 of the telephone answering device via line 37. Several such tone generators and decoders are already well known in the field, and this can be accomplished in any of the several well known ways. Reception and decoding of the control tone by the remote control circuit 35 whenever control is seized from a remote location suspends the normal automatic reception and message recording function of the answering device.

In a first embodiment, upon seizure, the head switching relay 23, responsive to the remote control circuit 35 is automatically switched to contact 23a to connect the magnetic transducer 19 associated with the pre-recorded position information channel 13 to the input of playback amplifier 25. The remote control circuit 31 is also effective to place the tape transport mechanism in the playback mode at that time so that the pre-recorded position information is detected by transducer 19 and supplied through head switching relay 23 to playback amplifier 25.

Thus, for example, if the user upon accessing his machine hears the voice message "twelve minutes, ten seconds", he knows that in addition to the rewind time, he will need to listen for some time in excess of twelve minutes to receive all of the recorded message information. Accordingly, with this knowledge, the user is better able to decide whether he should play it back immediately or postpone the playback until a more convenient time when he can allocate in excess of the time required to complete the playback operation. As previously noted, the positional information can also be given in terms of the length of tape used to that point in recording the telephone messages.

If the user then decides that he has time to listen to the recorded messages, he applies a rewind tone of a different frequency to the remote control circuit 35 via the telephone line from his remote telephone location. Upon receipt of the rewind tone, the remote control circuit 35 disables head switching relay 23 so that it drops out and connects with contact 23b to connect the transducer 21 associated with the message channel 15 to the playback amplifier input through relay 23. When the rewind tone is removed upon completion of the operation, the telephone answering apparatus is switched into the forward mode of operation to play out the recorded messages.

If tape position information is subsequently desired, the first selective tone frequency is placed on the line which will again operate head switching relay 23, responsive to the remote control circuit 35, to reconnect the magnetic transducer 19 associated with the positional track information to the input of playback amplifier 25. Alternate operations of the selective tones will throw the relay arrangement in and out thus providing a choice of listening to the position indicating information or the playback of the recorded telephone messages.

The remote control circuit 35 is shown in greater detail in FIG. 3A. More particularly, there it may be seen that the normally open contacts 41a of a seize relay 41 and the normally closed contacts 43a of a rewind relay 43 are coupled in parallel between a source of d.c. operating (B+) potential and the head switching relay 23 which, in turn, is referenced to ground potential. A second pair of contacts 23c of head switching relay 23, which are normally open, are interposed between the B+ source and the rewind relay contacts 43a.

In the switching sequence, the seize relay 41 is enabled responsive to the selective seize tone so that the seize relay contacts 41a close momentarily to apply the B+ potential to the head switching relay 23 thereby enabling relay 23. The head switching relay 23, in turn, latches in through its own contact, 23c, and the normally closed rewind relay contacts 43a. This action enables the head switching relay 23 to connect the magnetic transducer 19 of the playback head 17 to the input of playback amplifier 25 through the head switching relay contacts 23a. At this time the positional information is transmitted to the user.

When the rewind tone is applied, the rewind relay contacts 43a are opened to unlatch the head switching relay 23 and thereby connect the input of the playback amplifier 25 to the magnetic transducer 21 associated with the message channel 15 through contacts 23b. This results in the playback of the recorded telephone messages.

In an alternative embodiment shown in FIG. 3B, a remote control circuit 35 comprising manual switching means is shown. There, a ratchet relay 45, having a pivoted ratchet 45a contacting a contact element 45b which is alternately opened and closed as ratchet 45a rotates, interconnects the head switching relay 45 and the source of B+ potential. After seizing control of the apparatus, a tone of selected frequency is applied to the remote control circuit 35 from the remotely located telephone 33 to operate the ratchet relay 45. Since the ratchet 45 is a bi-stable device, alternate applications of the tone will either open or close the contacts 45b by rotating the ratchet 45a. Responsive thereto, the head switching relay 23 will be correspondingly switched between contacts 23a and 23b.

Accordingly, if the user subsequently wishes to know the position of the tape, the selective tone can be applied to operate ratchet relay 45. The ratchet relay 45 will alternately open and close thereby switching the head switching relay 23 to either switch the position channel 13 or the message channel 15 to the playback amplifier 25 to respectively play back the tape position information or the recorded messages.

Accordingly, there has been shown apparatus for enabling the user of a remotely controlled telephone answering machine to receive an audible indication of the present position of a magnetic tape relative to the beginning of the tape, either in terms of elapsed recording time or the amount of tape which has been used for recording. Thus, the user is informed immediately after accessing the answering machine as to exactly how much tape must be rewound and played back thereby providing him with informational inputs which will enable him to determine whether or not to receive the recorded messages at that time.

While a particular embodiment of the present invention has been shown and described, it will be obvious to those skilled in the art that various changes and modifications may be made without departing from the invention in its broader aspects. Accordingly, the aim in the appended claims is to cover all such changes and modifications as should fall within the true spirit and scope of the invention.

What is claimed is:

1. In a remotely controlled telephone answering device for recording messages from remotely located telephones, apparatus comprising:
   a recording medium comprising at least a first channel having positional information recorded thereon and a second channel for recording telephone messages;
   playback means comprising first and second sensing means for respectively monitoring said first channel and said second channel and converting said positional information and said recorded messages into electrical signals representative thereof;
   means including an amplifier for amplifying and converting said electrical signals into audio signals for conveying the content of said positional information and said recorded messages to said telephones; and
   switching means for selectively coupling said first sensing means and said second sensing means to said amplifier during different time intervals.

2. Apparatus in accordance with claim 1 including remote control means responsive to first and second remotely generated tone frequencies for controlling said switching means, said remote control means enabling said switching means responsive to said first tone frequency to connect said first sensing means to said amplifier and enabling said switching means responsive to said second tone frequency to connect said second sensing means to said amplifier.

3. Apparatus in accordance with claim 1 wherein said switching means comprises a relay responsive to said remote control means.

4. Apparatus in accordance with claim 1 wherein said playback means comprises a playback head having first and second sensing inductances for monitoring said first and second channels, respectively, to generate said electrical signals.

5. Apparatus in accordance with claim 1 wherein said recording medium comprises a two track magnetic recording tape.

6. In a remotely controlled telephone answering device for recording messages from and playing back said messages to remotely located telephones, apparatus comprising:
   a recording medium;
   means for recording messages from said remote telephones onto said recording medium;
   positional information means including recording indicia on said recording medium related to the length of said recorded messages to be played back;
   means for converting said recording indicia to audio information and conveying to said remote telephone said length of recorded messages on said recording medium; and
   means for selectively conveying said recording indicia prior to playing back said recorded messages.

* * * * *